United States Patent [19]

Arikawa

[11] Patent Number: 4,921,313
[45] Date of Patent: May 1, 1990

[54] ANTI-SKID CONTROL APPARATUS FOR VEHICLE BRAKING SYSTEM

[75] Inventor: Tetsuro Arikawa, Kanagawa, Japan

[73] Assignee: Nippon A.B.S., Ltd., Japan

[21] Appl. No.: 113,257

[22] Filed: Oct. 26, 1987

[30] Foreign Application Priority Data

Oct. 28, 1986 [JP] Japan .................. 61-256657

[51] Int. Cl.$^5$ .............................................. B60T 8/40
[52] U.S. Cl. .............................. 303/116; 303/119
[58] Field of Search ............ 303/116, 119, 96, 98, 303/91, 10, 71, 93, 103, 113, 114, 115, 117; 364/426

[56] References Cited

U.S. PATENT DOCUMENTS

| | | | |
|---|---|---|---|
| 4,418,966 | 12/1983 | Hattwig | 303/100 |
| 4,453,782 | 6/1984 | Arikawa et al. | 303/116 |
| 4,491,919 | 1/1985 | Leiber | 364/426 |
| 4,592,599 | 6/1986 | Belart | 303/119 |
| 4,637,664 | 1/1987 | Arikawa | 303/111 |
| 4,726,630 | 2/1988 | Krohn et al. | 303/119 |

Primary Examiner—Andres Kashnikow
Assistant Examiner—Mark T. Le
Attorney, Agent, or Firm—Jones, Day, Reavis & Pogue

[57] ABSTRACT

An anti-skid control apparatus for a vehicle braking system in which wheel cylinders for front and rear wheels are diagonally connected in conduits includes a first fluid pressure control valve device for controlling the brake fluid pressure of the wheel cylinder of one of the front wheels or rear wheels is arranged between a first fluid pressure generating chamber of a tandem master cylinder and said wheel cylinder of the one front or rear wheel. A second fluid pressure control valve device for controlling the brake fluid pressure of the wheel cylinder of another of the front wheels or rear wheels is arranged between a second fluid pressure generating chamber of said tandem master cylinder and the wheel cylinder of the other front or rear wheel. Each of the first and second fluid pressure control valve devices consists of a three-port two-position change-over valve connected to the master cylinder side and a two-port two-position change-over valve connected in series with the three-port two-position change-over valve and the conduit connecting the three-port two-position change-over valve with the two-port two-position change-over valve being connected to the wheel cylinder of the one or other front or rear wheel of the corresponding conduit system and first judging results for relieving the brake of the front and rear wheels are logically combined with second judging results for maintaining the braking of the first and rear wheels constant, for generating instructions to control the change-over valves.

4 Claims, 5 Drawing Sheets

FIG.5

ANTI-SKID CONTROL APPARATUS FOR VEHICLE BRAKING SYSTEM

BACKGROUND OF THE INVENTION

1. Field of the Invention

This invention relates to an anti-skid control apparatus for a vehicle braking system which can prevent locking of the wheels.

2. Description of the Prior Art

Figure 1:
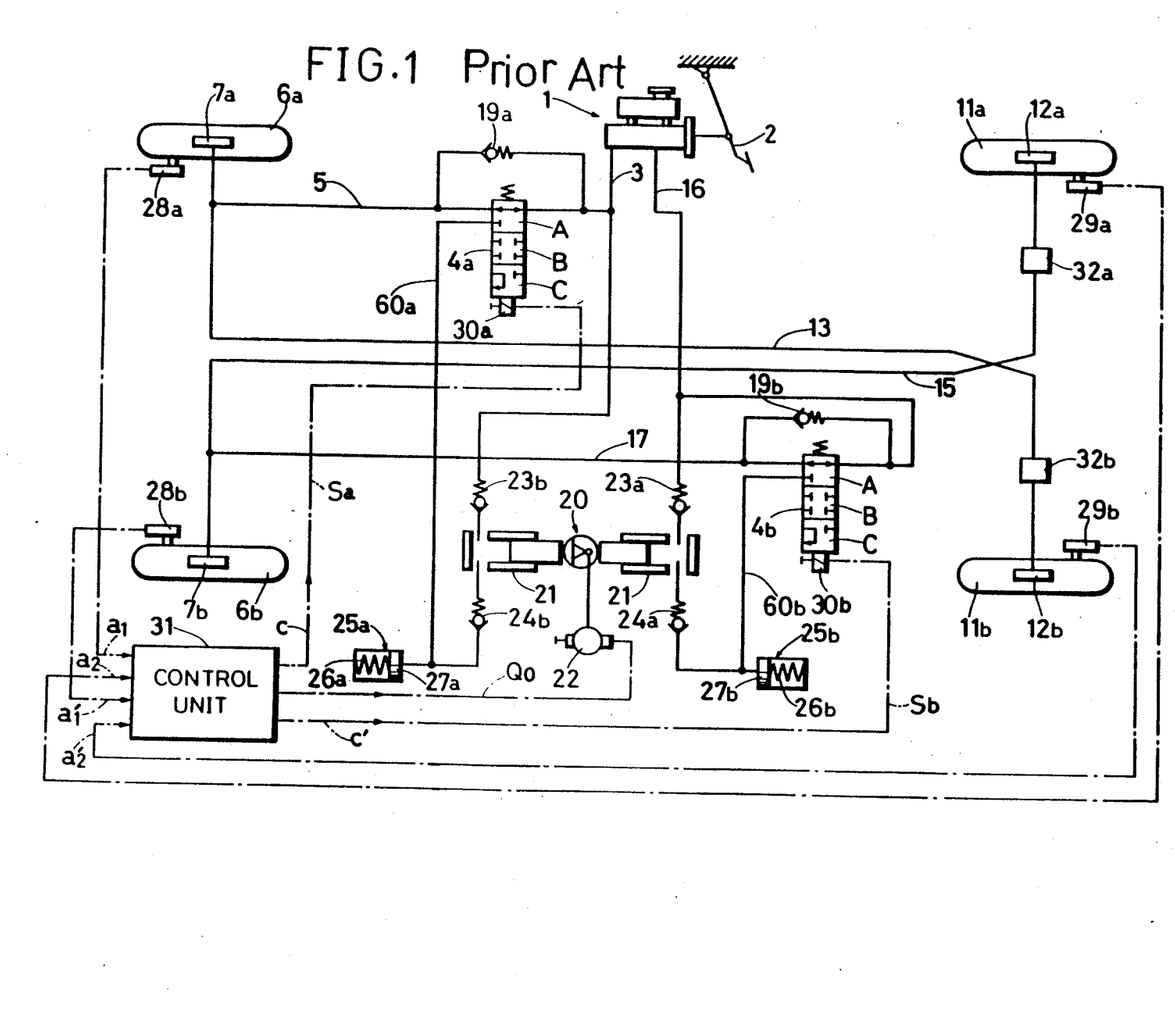
FIG. 1 is a schematic view of a prior art anti-skid control apparatus.

For example, the anti-skid control apparatus shown in FIG. 1 is known.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic three position valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro-magnetic three position valve device 4b and a conduit 17. The conduit 17 is further connected to a wheel cylinder 12a of a right rear wheel 11a through a conduit 15 an a proportioning valve 32a.

Discharge openings of the valves 4a and 4b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserve chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20, or the sides of the check valves 23a, 23b are connected to the conduits 3 and 16.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31.

The control unit 31 has a well-known circuit construction. It generates control signals Sa, Sb and a motor drive signal Qo. The control signals Sa, Sb are supplied to solenoid portions 30a and 30b of the valves 4a and 4b respectively. Dashed lines represent electric lead wires.

Although the electromagnetic valves 4a and 4b are shown schematically, their construction is well known. When the level of the control signal is "0", the valves take first positions A for increasing the brake pressures at each wheel. In the first positions A, the master cylinder side and the wheel cylinder side are connected. When the level of the control signals is "1", the valves take third positions C for decreasing the brake pressure to the brakes. In the third positions C, the connection between the master cylinder side and the wheel cylinder side is interrupted, while a connection is made between the wheel cylinder side and the reservoir side. The brake fluid is discharged through the conduit 60a and 60b into the reservoir 25a and 25b from the wheel cylinders 7a, 7b and 12a and 12b. When the level of the control signal is "½", the valves 4a and 4b take second positions B. The communications between the master cylinder side and the wheel cylinder side and between the wheel cylinder side and the reservoir side are interrupted. Thus, the fluid pressure to the brakes is kept constant.

The control unit 31 further generates the drive signal Qo for the motor 22, which signal continues during the skid control operation.

Generally in the arrangement described above arrangement, the braking forces are so distributed that the front wheels 6a and 6b tend to lock sooner than the rear wheels 11a and 11b. Accordingly, the control signals Sa and Sb become "1" for relieving the brakes of the front wheels 6a and 6b. The change-over valves 4a and 4b are changed over into the position C. The pressurized fluid is discharged into the reservoirs 25a 25b from the wheel cylinders 7a and 7b. Accordingly, the brakes of the front wheels 6a and 6b are relieved. However, at the same time, pressurized fluid is discharged into the reservoirs 25a 25b also from the wheel cylinders 12a and 12b of the rear wheels 11a 11b. Thus, also the brakes of the rear wheels 11a and 11b are relieved, although the rear wheels 11a 11b have not yet tended to lock. Thus, the rear wheels 11a 11b are subject to under-brake. The word "under-brake" means that the braking force is insufficient.

However, when the above assumption is not fulfilled, for example, when only the front wheels are provided with spiked tires or chains for running on snow or ice, and the rear wheels are provided with the normal tires, the rear wheels tend to lock sooner than the front wheels.

Even when the front and wheels are provided with tires of the same kind, the rear wheels may tend to lock sooner than the front wheels, when the frictional coefficient of the brake lining becomes excessively low due to thermal fade phenomenon in a front wheel brake apparatus and the limit lock pressure of the front wheel becomes excessively high.

In the above cases, the front wheels are subject to under-braking.

Even when the braking forces are equally distributed for the front wheels 6a 6b and the rear wheels 11a 11b, there is the following problems: When the so called "select low control" is effected between the front and rear wheels of the same conduit system on the road which is frictionally different at both sides, defined as a split road, the front or rear wheel on the high-$\mu$ (frictional coefficient) side of the road is subject to a remarkable under-brake.

In the "select low control", the change-over valves are controlled with the skid condition of the front or rear wheel on the one side of the road which is frictionally lower than the other side of the road. Or when the "select high control" is effected between the front and rear wheels of the same conduit system on a split road, the front or rear wheel on the low-$\mu$ side of the road is subject to locking. Thus, the running stability of the vehicle is lost. That is dangerous.

In the above embodiment, there are only two change-over valves 4a and 4b. Accordingly, the cost is relatively low, but in any case, under-braking cannot be avoided.

Of course, when four three-position change-over valves are provided for all of the wheels, respectively for controlling them independently, there is no problem. However, the three position change-over valve is complicated in construction and it is expensive. Accordingly, the cost is significantly higher.

SUMMARY OF THE INVENTION

Accordingly, it is an object of this invention to provide an anti-skid control apparatus for a vehicle braking system in which the four wheels can be controlled nearly with the accuracy of the case that four three-position change-over valves are used which can shorten the braking distance and by which the cost can be lowered.

In this invention, a three-port two-position change-over valve connected to the master cylinder side and a two-port two-position change-over valve which is connected in series with the three-port two-position change-over valve and connected to the front or rear wheel cylinder side, are used instead of the three-port three-position change-over valve. A conduit connecting the above change-over valves is connected to the rear or front wheel cylinder side of the corresponding conduit system. First judging results for relieving the brake of the front and rear wheels are logically combined with second judging results for maintaining the brake of the front and rear wheels, for generating instructions to control the change-over valves.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 2:
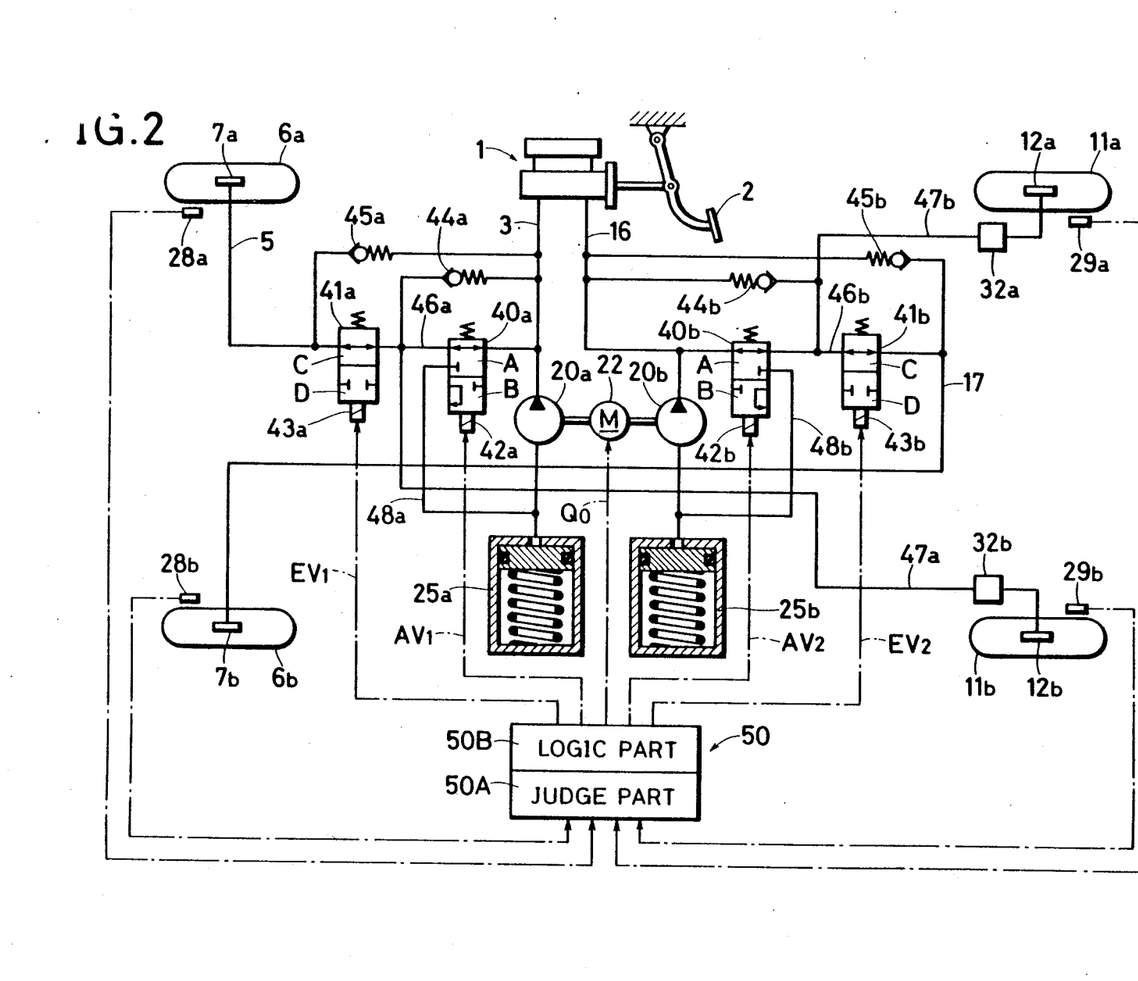
FIG. 2 is a schematic view of an anti-skid control apparatus according to an embodiment of this invention.

In FIG. 2, a brake pedal 2 is connected to a tandem master cylinder 1. Two fluid pressure chambers of the tandem master cylinder 1 are connected to wheel cylinders 7a 7b of front wheels 6a 6b through conduits 3, 16 first change-over valves 40a, 40b and second change-over valves 41a, 41b and conduits 517 respectively. The first change-over valves 40a, 40b and the second change-over valves 41a, 41b are connected in series with each other. Conduits 46a, 46b which connect those valves 40a, 40b and 41a, 41b are connected to wheel cylinders 12a, 12b of rear wheels 11a, 11b through conduits 47a, 47b, proportional reducing valves 32b, 32a.

The first change-over valves 40a, 40b are three-port two-position electromagnetic change-over valves. When their solenoid portions 42a, 42b are not energized, they take a first position A as shown in FIG. 2. Their input ports and output ports are made to communicate with each other, at the position A. Further in the above embodiment, third change-over valves having the same construction as the second change-over valves 41a, 41b, in which input and output ports are normally connected together but when their solenoids are energized, they are disconnected from each other, may be arranged in the conduits 47b and 47a to the wheel cylinders 12a and 12b of the rear wheels. When their solenoid portions 42a, 42b are energized, they take a second position B. Their output ports and discharge ports are made to communicate with each other at the position B. Thus, their output ports and hydraulic reservoirs 25a, 25b are made to communicate with each other through conduits 48a, 48b.

The second change-over valves 41a, 41b are two-port two-position electromagnetic change-over valves. When their solenoid portions 43a, 43b are not energized, they take a first position C as shown in FIG. 2. Their input ports and output ports are made to communicate with each other at the position C. When their solenoid portions 43a, 43b are energized, their input ports and the output ports are intercepted from each other. Check valves 44a, 44b, 45a and 45b are connected in parallel with the first and second change-over valves 40a, 40b, 41a and 41b, respectively. The check valves 44a, 44b, 45a and 45b permit fluid to flow only in the direction from the wheel cylinder side to the master cylinder side. A control unit 50 receives output signals of wheel speed sensors 28a, 28b, 29a and 29b, and generates five kinds of signals as described hereinafter, which are EV1, AV1, EV2, AV2 and Qo. The signals EV1, EV2 are supplied to the solenoid portions 43a, 43b of the second change-over valves 41a, 41b. The signals AV1, AV2 are supplied to the solenoid portions 42a, 42b of the first change-over valves 40a, 40b. The signal Qo is supplied to a motor 22.

The control unit 50 consists of a judge part 50A and a logic part 50B. The judge part 50A judges skid conditions of the wheels 6a, 6b, 11a and 11b, and generates judge signals to relieve the brake and to maintain the braking force constant. The logic part 50B combines these judge signals logically, and generates the above described control signals EV1, EV2, AV1 and AV2.

Judge circuits for the wheels have the same circuit constructions as the judge part 50A. Accordingly, only the judge circuit for the right front wheel 6a will be described in detail with reference to FIG. 3.

Figure 3:
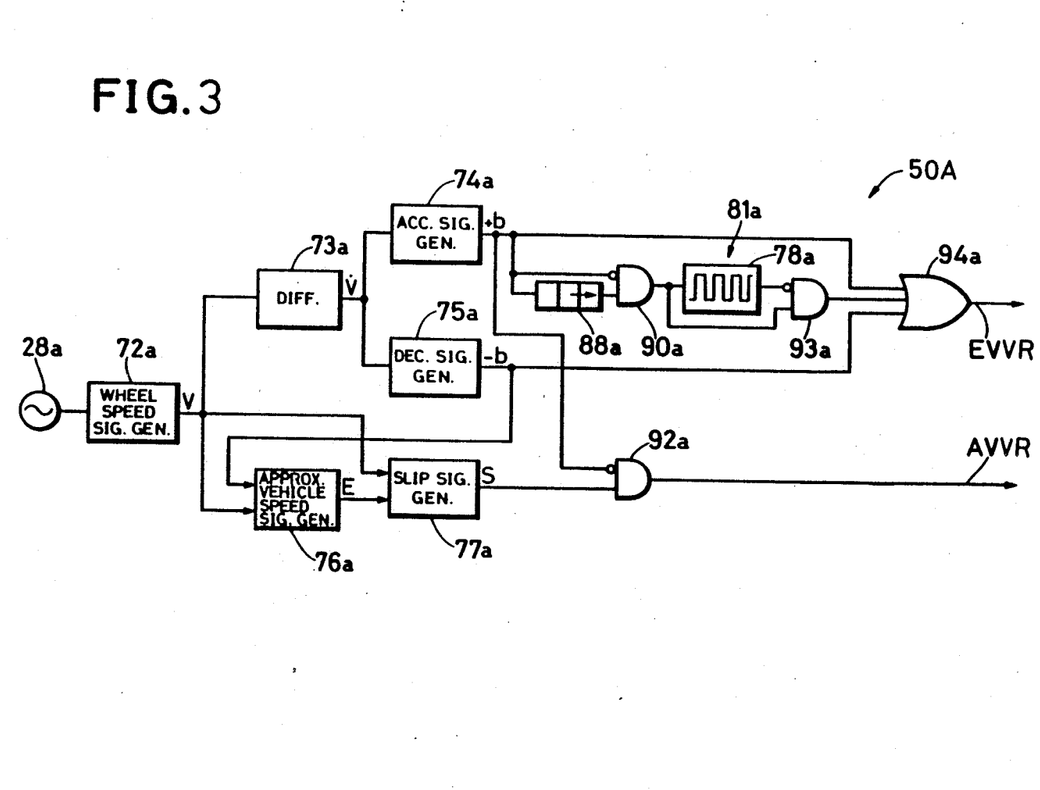
FIG. 3 is a block diagram of a part of a judge part of a control unit in FIG. 2.

The signal from the wheel speed sensor 28a is supplied to a wheel speed signal generator 72a. Digital or analogue output proportional to the wheel speed is obtained from the wheel speed signal generator 72a, and it is supplied to an approximate vehicle or body speed signal generator 76a a slip signal generator 77a and a differentiator 73a.

The approximate vehicle speed signal generator 76a receives the output of the wheel speed signal generator 72a. The output of the approximate vehicle speed signal generator 76a is equal to the output of the wheel speed signal generator 72a, until the deceleration of the wheel reaches a predetermined value. After it becomes higher than the predetermined value, the outputs of the approximate vehicle speed signal generators 76a decreases at a predetermined rate with time. The initial output is equal to the output at the time when the deceleration of the wheel has reached the predetermined value. The output of the approximate vehicle speed signal generator 76a is supplied to the slip signal generator 77a to be compared with the output of the wheel speed signal generator 72a. A predetermined reference ratio or amount is set in the respective slip signal generator 77a.

The reference ratio or amount is for example, 0.15 (15%).

Generally, a slip ratio S of the wheel is given by the following formula:

$$S = 1 - \frac{\text{wheel speed }(V)}{\text{vehicle speed }(E)}$$

When $$\left(1 - \frac{V}{E}\right)$$

is larger than the reference ratio, a slip signal S is generated from the slip signal generator 77a, namely the output of the slip signal generator 77a, becomes a higher level "1" of the two levels "1" and "0".

The differentiator 73a receives the output of the wheel speed signal generator 72a, and differentiates it with respect to time. The output of the differentiator 73a is supplied to a deceleration signal generator 75a, and to an acceleration signal generator 74a. A predetermined threshold deceleration (for example, −1.5 g) is set in the deceleration signal generator 75a, and it is compared with the output of the differentiator 73a. A predetermined threshold acceleration (for example, 0.5 g) is set in the acceleration signal generator 74a, and it is compared with the output of the differentiator 73a. When the deceleration of the wheel becomes larger than the predetermined threshold deceleration (−1.5 g), a deceleration signal b is generated from the deceleration signal generators 75a. When the acceleration of the wheel becomes larger than the predetermined threshold acceleration (0.5 g), an acceleration signal +b is generated from the acceleration signal generator 74a.

An output terminal of the acceleration signal generator 74a is connected to a negation input terminal (indicated by circle O) of an AND gate 92a, a negation input terminal of an AND gate 90a, an OFF delay timer 88a, and a first input terminal of an OR gate 94a. An output terminal of the OFF delay timer 8a is connected to an input terminal of the AND gate 90a. An output terminal of the AND gate 90a is connected to an input terminal of a pulse generator 78a, and an input terminal of an AND gate 93a. An output terminal of the pulse generator 78a is connected to a negation input terminal of the AND gate 93a. A stepwise brake-increasing signal generator 81a comprised the acceleration signal generator 74a, the OFF-delay timer 88a, the pulse generator 78a, the OR gate 94a, and the AND gate 90a, 93a and it generates pulse signals to slowly increase the brake pressure for delay time of the OFF delay timer 88a. An output terminal of the AND gate 93a is connected to a second input terminal of the OR gate 94a.

An output terminal of the deceleration signal generator 75a is connected to a third input terminal of the OR gate 94a and to an input terminal of the approximate vehicle speed signal generator 76a. An output terminal of the slip signal generator 77a is connected to an other input terminal of the AND gate 92a. An output terminal of the AND gate is connected to a motor drive circuit shown in FIG. 4. The motor drive circuit is rendered a part of the judge part 50A.

The output of the OR gate 94a is a signal EVVR to maintain the brake at constant. The output of the AND gate 92a is a signal AVVR to relieve the brake. Similarly, signals EVVL, AVVL, EVHR AVHR and EVHL AVHL are generated from the left front wheel 6b and the right and left rear wheels 11a, 11b, respectively. The letter V represents "front" and the letter H represents "rear".

Figure 4:
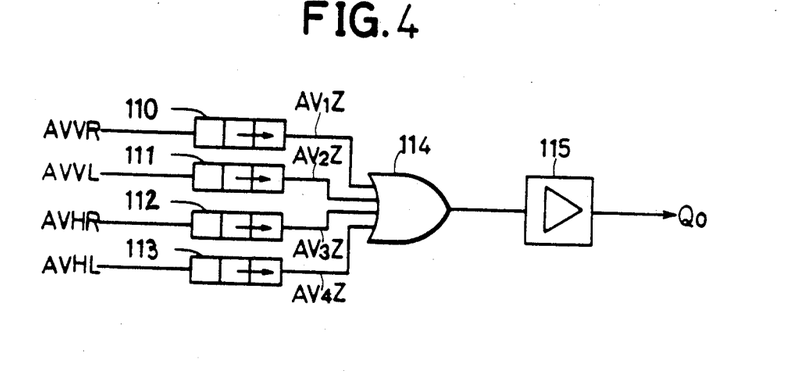
FIG. 4 is a circuit diagram of a motor drive circuit included in the control unit in FIG. 2.

As shown in FIG. 4, the motor drive circuit consists of OFF delay timers 110, 111, 112 and 113, an OR gate 114 which receive outputs of these OFF delay timers and an amplifier 115. The above described outputs AVVL, AVVR, AVHL and AVHR are supplied to input terminals of the OFF delay timers 110, 111, 112 and 113. Outputs $AV_1Z$, $AV_2Z$, $AV_3Z$ and $AV_4Z$ of the timer 110, 111, 112 and 113 become "1" with the input-signal "1". After the input-signal becomes "0", the output of the timer is maintained at "1" for the delay time. The OFF delay time is so long as to maintain "1" during the anti-skid control operation after the output of the timer becomes "1". The output of the OR gate 114 is amplified by the amplifier 115. This amplified output is the above described motor drive signal Q.

Figure 5:
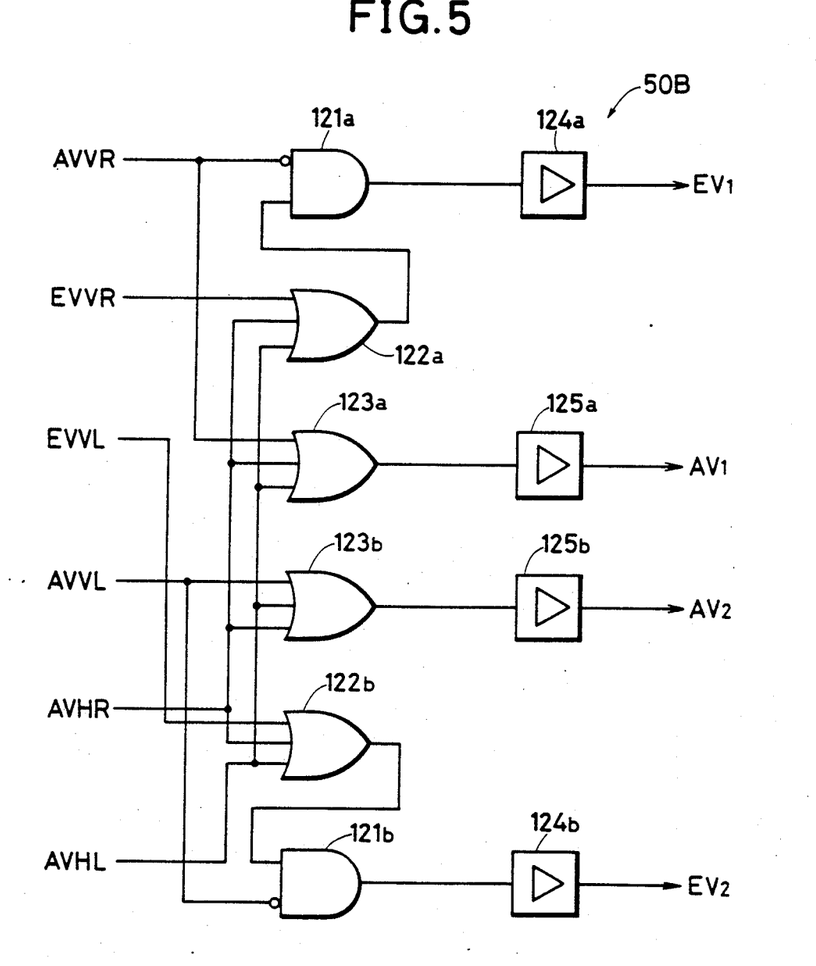
FIG. 5 is a circuit diagram of a logic part of the control unit in FIG. 2.

Next, the circuit construction of the logic part 50B in the control unit 50 will be described with reference to FIG. 5.

The logic part 50B receives the outputs AVVR, EVVR, AVVL, EVVL, AVHR and AVHL of the judge part 50A and combines these signals logically. The signals AVVR and AVVL are supplied to negation input terminals of AND gates 121a and 121b. Output signals of OR gates 122a and 122b are supplied to other input terminals of the AND gates 121a and 121b. The signals EVVR and EVVL are supplied to first input terminals of the OR gates 122a, 122b and the signal AVHR is supplied to second input terminals thereof. The signal AVHL is supplied to third input terminals thereof. The signals AVVR, AVHR, AVHL and AVVL, AVHR, AVHL are supplied to three input terminals of OR gates 123a and 123b, respectively.

The output terminals of the AND gates 121a and 121b are connected to amplifiers 124a and 124b, the outputs of which are the above described control signals EV1 and EV2, respectively. The output terminals of the OR gates 123a and 123b are connected to amplifiers 125a and 125b. The outputs of the amplifiers 125a and 125b are the above described control signals AV1 and AV2, respectively.

The logic part 50B of this embodiment is constructed as described above. Its logic formula is the following:

$$EV1 = \overline{AVVR} \cdot (EVVR + AVHL + AVHR)$$

$$AV1 = AVVR + AVHL + AVHR$$

$$EV2 = \overline{AVVL} \cdot (EVVL + AVHL + AVHR)$$

$$AV2 = AVVL + AVHL + AVHR.$$

where $\overline{AVVR}$ and $\overline{AVVL}$ are the negations of AVVR and AVVL.

Next, there will be described operations of the above described anti-skid control apparatus of this embodiment.

It is now assumed that the vehicle runs on a road with a uniform frictional coefficient and that the rear wheels 11a and 11b tend to lock sooner than the front wheels 6a and 6b.

When the slip of the rear wheels 11a and 11b becomes higher than the predetermined slip ratio at a certain time, the slip signal is generated. Accordingly, the output signals AVHR and AVHL are generated from the judge part 50A. First, suppose that the output signals AVHR and AVHL are generated at the same time, while the output signals AVVR and AVVL are not still generated. As is clear from FIG. 5, the control signals AV1, AV2 and EV1, EV2 become "1" as higher level. Accordingly, the change-over valves 40a 40b 41a and 41b are changed over into the positions B and D, respectively.

In the second change-over valves 41a and 41b, communication between the output ports and the input ports is intercepted, and the braking force of the front wheels 6a and 6b are maintained constant. On the other hand, in the first change-over valves 40a and 40b, the output ports and the input ports are disconnected from each other, but the output ports and the discharge ports are made to communicate with each other. Accordingly, pressurized fluid is discharged into the reservoirs 25a and 25b from the wheel cylinders 12a and 12b of the rear wheels 11a and 11b. Thus, the brakes of the rear wheels 11a and 11b are relieved.

Meanwhile, the slip of the front wheels 6a and 6b becomes higher than the predetermined slip ratio and so the signals AVVR and AVVL become "1". Accordingly, the control signals EV1 and EV2 become "0". The second change-over valves 41a and 41b are again changed over into the position C and so the input ports and the output ports are connected. Thus, pressurized fluid is discharged into the reservoirs 25a and 25b also from the wheel cylinders 7a and 7b of the front wheels 6a and 6b. Thus, the braking of the front wheels 6a and 6b relieved.

In the case just described the vehicle was running on a road with a uniform frictional coefficient. Now, consider the case when the vehicle runs on a split road in which the frictional coefficients are remarkably different at both sides of the road. It is now assumed that the right side of the road is the lower frictional road side and the left side is the higher frictional side.

When the slip of the right rear wheel 11a becomes higher than the predetermined slip ratio, the output signal AVHR becomes "1". Accordingly, the signals AV1 and AV2 become "1". On the other hand, the signals AVVR and AVVL are not still generated from the front wheels 6a and 6b, and the output signal EV1 and EV2 become "1". The first change-over valves 40a and 40b are changed over into the position B and the second change-over valves 41a and 41b are changed over into the position D. Thus, the braking of the front wheels 6a and 6b is maintained constant and the braking of the rear wheels 11a and 11b is relieved.

When the signal AVVR is generated from the right front wheel 6a, the signal EV1 become "0". Accordingly, the second change-over valve 41a is changed over into the position C. The wheel cylinder of the right front wheel 6a is made to communicate with the reservoir 25a and so the brake of the right front wheel 6a is relieved. Thus, while the front and rear wheels 6a and 11a on the low-$\mu$ (frictional coefficient) side of the road can be securely prevented from locking, the brake of the front wheel 6b on the high-$\mu$ side of the road can be maintained. Thus, the under brake of the front wheel 6b can be prevented.

When the signal EVVR is generated sooner from the right front wheel 6a, the signal EV1 become "1". Accordingly, the second change-over valve 41a is changed over into the position D. However, the first change-over valve 40a remains changed over into the position A. Accordingly, the brake of the rear wheel 11b on the high-$\mu$ side of the road is increased, while the brake of the right front wheel 6a on the low-$\mu$ side of the road is maintained at constant so that the right front wheel 6a can be prevented from locking. On the other hand, the under-brake of the rear wheel 11b on the high-$\mu$ side of the road can be prevented.

When the brake pedal 2 is released to relieve the brake, pressurized fluid is returned rapidly into the master cylinder, through the check valves 44a 44b 45a and 45b. Thus the brake is rapidly relieved.

While the preferred embodiment has been described, variations thereto will occur to those skilled in the art within the scope of the present inventive concepts which are delineated by the following claims.

For example, in the above embodiment, the conduits 46a and 46b connecting the first change-over valves 40a and 40b and the second change-over valves 41a and 41b are connected to the rear wheel cylinders. Insteads, the conduits 46a and 46b may be connected to the front wheel cylinders. In that case, the output ports of the second change-over valves 41a and 41b are connected to the rear wheel cylinders, instead of the front wheel cylinders as in the embodiment described above.

Further, in the above embodiment, the signals EVHR and EVHL from the rear wheels 11a and 11b are not used in the logic part 50B. Of course, they may be combined logically with the other signals.

Further, in the above embodiment, the pumps 20a and 20b, and the reservoirs 25a and 25b are two, respectively. However, they may be single, respectively.

What is claimed is:

1. In an anti-skid control apparatus for a vehicle braking system including:
   (A) a pair of front wheels, and a pair of rear wheels in which wheel cylinders are diagonally connected in conduits;
   (B) a first fluid pressure control valve device for controlling the brake fluid pressure of the wheel cylinder of one of said front wheels or rear wheels, arranged between a first fluid pressure generating chamber of a tandem master cylinder and said wheel cylinder of the one front or rear wheel;
   (C) a second fluid pressure control valve device for controlling the brake fluid pressure of the wheel cylinder of another of said front wheels or rear wheels, arranged between a second fluid pressure generating chamber of said tandem master cylinder and said wheel cylinder of the other front or rear wheel;
   (D) a control unit for measuring or judging the skid conditions of said front and rear wheels and for generating instructions for controlling said first and second fluid pressure control valve devices;
   (E) a hydraulic reservoir which, when the brake fluid pressure to said wheel cylinder is decreased with control of said first and/or second fluid pressure control valve device, reserves the brake fluid discharged through said first and/or second fluid pressure control valve device from said wheel cylinder;
   (F) a pressure fluid supply conduit connecting said master cylinder with said first and second fluid pressure control valve devices; and
   (G) a fluid pump for returning the brake fluid from said hydraulic reservoir into said pressure fluid supply conduit; the improvements in which each of said first and second fluid pressure control valve devices consists of a three-port two-position change-over valve and a two-port two-position change-over valve which are connected in series with each other, the conduit connecting said three-port two-position change-over valve with said two-port two-position change-over valve being connected to the wheel cylinder of said one or other rear or front wheel, said three-port two-position change-over valve having an input port connected to said tandem master cylinder, an output port and a discharge port connected to said hydraulic reservoir, said input and output ports being made to communicate with each other at one position and said input and output ports being intercepted from each other at another position, said output and discharge port being made to communicate with each other at said another position, and said two-port two-position change-over valve has an input port and an output port, said input and output ports being made to communicate with each other at one position and said input and output ports being intercepted from each other at another position, said control unit combining logically first judging results from relieving the brake of said front and rear wheels and with second judging results for maintaining the brake of said front and rear wheels at constant, for generating instructions to control said change-over valves, whereby said three-port two-position valves are connected to said tandem master cylinder side and said two-port two-position valves are connected to said front wheel cylinder sides, said conduits between said three-port two-position valves and said two-port two-position valves being connected to said rear wheel cylinder sides, and whereby said three-port two-position valves are controlled with first instruction signals AV1 and AV2, respectively as represented by the following logic formulas, and said two-port two-position valves are controlled with second instruction signals EV1 and EV2, respectively as represented by the following logic formulas:

$AV1 = AVVR + AVHL + AVHR$ $AV2 = AVVL + AVHL + AVHR$ $EV1 = \overline{AVVR} \cdot (EVVR + AVHL + AVHR)$ $EV2 = \overline{AVVL} \cdot (EVVL + AVHL + AVHR),$ where AVVR, AVVL, AVHR and AVHL are the output signals representing the judging results for relieving the brakes of said one (right) front wheel, other (left) front wheel, one rear wheel and other rear wheel, respectively, EVVR and EVVL the output signals representing the judging results for maintaining the brakes of said one front wheel and other front wheel, respectively, and $\overline{AVVR}$ and $\overline{AVVL}$ are negation of the AVVR and AVVL.

2. In an anti-skid control apparatus for a vehicle braking system including:
 (A) a pair of front wheels, and a pair of rear wheels in which wheel cylinders are diagonally connected in conduits;
 (B) a first fluid pressure control valve device for controlling the brake fluid pressure of the wheel cylinder of one of said front wheels or rear wheels, arranged between a first fluid pressure generating chamber of a tandem master cylinder and said wheel cylinder of the one front or rear wheel;
 (C) a second fluid pressure control valve device for controlling the brake fluid pressure of the wheel cylinder of another of said front wheels or rear wheels, arranged between a second fluid pressure generating chamber of said tandem master cylinder and said wheel cylinder of the other front or rear wheel;
 (D) a control unit for measuring or judging the skid conditions of said front and rear wheels and for generating instructions for controlling said first and second fluid pressure control valve devices;
 (E) a hydraulic reservoir which, when the brake fluid pressure to said wheel cylinder is decreased with control of said first and/or second fluid pressure control valve device, reserves the brake fluid discharged through said first and/or second fluid pressure control valve device from said wheel cylinder;
 (F) a pressure fluid supply conduit connecting said master cylinder with said first and second fluid pressure control valve devices; and
 (G) a fluid pump for returning the brake fluid from said hydraulic reservoir into said pressure fluid supply conduit; the improvements in which each of said first and second fluid pressure control valve devices consists of a three-port two-position change-over valve and a two-port two-position change-over valve which are connected in series with each other, the conduit connecting said three-port two-position change-over valve with said two-port two-position change-over valve being connected to the wheel cylinder of said one or other rear or front wheel, said three-port two-position change-over valve having an input port connected to said tandem master cylinder, an output port and a discharge port connected to said hydraulic reservoir, said input and output ports being made to communicate with each other at one position and said input and output ports being intercepted from each other at another position, said output and discharge port being made to communicate with each other at said another position, and said two-port two-position change-over valve has an input port and an output port, said input and output ports being made to communicate with each other at one position and said input and output ports being intercepted from each other at another position, said control unit combining logically first judging results from relieving the brake of said front and rear wheels and with second judging results for maintaining the brake of said front and rear wheels at constant, for generating instructions to control said change-over valves, whereby said three-port two-position valves are connected to said tandem master cylinder side and said two-port two-position valves are connected to said rear wheel cylinder sides, said conduits between said three-port two-position valves and said two-port two-position valves being connected to said front wheel cylinder sides, and whereby said three-port two-position valves are controlled with first instruction signals AV1 and AV2, respectively as represented by the following logic formulas, and said two-port two-position valves are controlled with second instruction signals EV1 and EV2, respectively as represented by the following logic formulas:

$$AV1 = AVHR + AVVL + AVVR$$

$$AV2 = AVHL + AVVL + AVVR$$

$$EV1 = \overline{AVHR} \cdot (EVHR + AVVL + AVVR)$$

$$EV2 = \overline{AVHL} \cdot (EVHL + AVVL + AVVR),$$

where AVVR, AVVL, AVHR and AVHL are the output signals representing the judging results for relieving the brakes of said one (right) front wheel, other (left) front wheel, one rear wheel and other rear wheel, respectively, EVHR and EVHL the output signals representing the judging results for maintaining the brakes of said one rear wheel and other rear wheel, respectively, and $\overline{AVHR}$ and $\overline{AVHL}$ are negation of the AVHR and AVHL.

3. In an anti-skid control apparatus for a vehicle braking system including:
(A) a pair of front wheels, and a pair of rear wheels in which wheel cylinders are diagonally connected in conduits;
(B) a first fluid pressure control valve device for controlling the brake fluid pressure of the wheel cylinder of one of said front wheels or rear wheels, arranged between a first fluid pressure generating chamber of a tandem master cylinder and said wheel cylinder of the one front or rear wheel;
(C) a second fluid pressure control valve device for controlling the brake fluid pressure of the wheel cylinder of another of said front wheels or rear wheels, arranged between a second fluid pressure generating chamber of said tandem master cylinder and said wheel cylinder of the other front or rear wheel;
(D) a control unit for measuring or judging the skid conditions of said front and rear wheels and for generating instructions for controlling said first and second fluid pressure control valve devices;
(E) a hydraulic reservoir which, when the brake fluid pressure to said wheel cylinder is decreased with control of said first and/or second fluid pressure control valve device, reserves the brake fluid discharged through said first and/or second fluid pressure control valve device from said wheel cylinder;
(F) a pressure fluid supply conduit connecting said master cylinder with said first and second fluid pressure control valve devices; and
(G) a fluid pump for returning the brake fluid from said hydraulic reservoir into said pressure fluid supply conduit; the improvements in which each of said first and second fluid pressure control valve devices consists of a three-port two-position change-over valve and a two-port two-position change-over valve which are connected in series with each other, the conduit connecting said three-port two-position change-over valve with said two-port two-position change-over valve being connected to the wheel cylinder of said one or other rear or front wheel, said three-port two-position change-over valve having an input port connected to said tandem master cylinder, an output port and a discharge port connected to said hydraulic reservoir, said input and output ports being made to communicate with each other at one position and said input and output ports being intercepted from each other at another position, said output and discharge port being made to communicate with each other at said another position, and said two-port two-position change-over valve has an input port and an output port, said input and output ports being made to communicate with each other at one position and said input and output ports being intercepted from each other at another position, said control unit combining logically first judging results from relieving the brake of said front and rear wheels and with second judging results for maintaining the brake of said front and rear wheels at constant, for generating instructions to control said change-over valves, whereby said three-port two-position valves are connected to said front wheel cylinder sides and said two-port two-position valves are connected to said master cylinder side, said conduits between said three-port two-position valves and said two-port two-position valves being connected to said rear wheel cylinder sides, and whereby said three-port two-position valves are controlled with first instruction signals AV1 and AV2, respectively as represented by the following logic formulas, and said two-port two-position valves are controlled with second instruction signals EV1 and EV2, respectively as represented by the following logic formulas:

$$AV1 = AVVR + AVHL + AVHR$$

$$AV2 = AVVL + AVHL + AVHR$$

$$EV1 = \overline{AVVR} \cdot (EVVR + AVHL + AVHR)$$

$$EV2 = \overline{AVVL} \cdot (EVVL + AVHL + AVHR),$$

where AVVR, AVVL, AVHR and AVHL are the output signals representing the judging results for relieving the brakes of said one (right) front wheel, other (left) front wheel, one rear wheel and other rear wheel, respectively, EVVR and EVVL the output signals representing the judging results for maintaining the brakes of said one front wheel and other front wheel, respectively, and $\overline{AVVR}$ and $\overline{AVVL}$ are negation of the AVVR and AVVL.

4. In an anti-skid control apparatus for a vehicle braking system including:
(A) a pair of front wheels, and a pair of rear wheels in which wheel cylinders are diagonally connected in conduits;
(B) a first fluid pressure control valve device for controlling the brake fluid pressure of the wheel cylinder of one of said front wheels or rear wheels, arranged between a first fluid pressure generating chamber of a tandem master cylinder and said wheel cylinder of the one front or rear wheel;
(C) a second fluid pressure control valve device for controlling the brake fluid pressure of the wheel cylinder of another of said front wheels or rear wheels, arranged between a second fluid pressure generating chamber of said tandem master cylinder and said wheel cylinder of the other front or rear wheel;
(D) a control unit for measuring or judging the skid conditions of said front and rear wheels and for generating instructions for controlling said first and second fluid pressure control valve devices;

(E) a hydraulic reservoir which, when the brake fluid pressure to said wheel cylinder is decreased with control of said first and/or second fluid pressure control valve device, reserves the brake fluid discharged through said first and/or second fluid pressure control valve device from said wheel cylinder;

(F) a pressure fluid supply conduit connecting said master cylinder with said first and second fluid pressure control valve devices; and (G) a fluid pump for returning the brake fluid from said hydraulic reservoir into said pressure fluid supply conduit; the improvements in which each of said first and second fluid pressure control valve devices consists of a three-port two-position change-over valve and a two-port two-position change-over valve which are connected in series with each other, the conduit connecting said three-port two-position change-over valve with said two-port two-position change-over valve being connected to the wheel cylinder of said one or other rear or front wheel, said three-port two-position change-over valve having an input port connected to said tandem master cylinder, an output port and a discharge port connected to said hydraulic reservoir, said input and output ports being made to communicate with each other at one position and said input and output ports being intercepted from each other at another position, said output and discharge port being made to communicate with each other at said another position, and said two-port two-position change-over valve has an input port and an output port, said input and output ports being made to communicate with each other at one position and said input and output ports being intercepted from each other at another position, said control unit combining logically first judging results from relieving the brake of said front and rear wheels and with second judging results for maintaining the brake of said front and rear wheels at constant, for generating instructions to control said change-over valves, whereby said three-port two-position valves are connected to said rear wheel cylinder sides and said two-port two-position valves are connected to said master cylinder side, said conduits between said three-port two-position valves and said two-port two-position valves being connected to said front wheel cylinder sides, and whereby said three-port two-position valves are controlled with first instruction signals AV1 and AV2, respectively as represented by the following logic formulas, and said two-port two-position valves are controlled with second instruction signals EV1 and EV2, respectively as represented by the following logic formulas:

$$AV1 = AVHR + AVVL + AVVR$$

$$AV2 = AVHL + AVVL + AVVR$$

$$EV1 = \overline{AVHR} \cdot (EVHR + AVVL + AVVR)$$

$$EV2 = \overline{AVHL} \cdot (EVHL + AVVL + AVVR),$$

where AVVR, AVVL, AVHR and AVHL are the output signals representing the judging results for relieving the brakes of said one (right) front wheel, other (left) front wheel, one rear wheel and other rear wheel, respectively, EVHR and EVHL and output signals representing the judging results for maintaining the brakes of said one rear wheel and other rear wheel, respectively, and $\overline{AVHR}$ and $\overline{AVHL}$ are negation of the AVHR and AVHL.

* * * * *

UNITED STATES PATENT AND TRADEMARK OFFICE
CERTIFICATE OF CORRECTION

PATENT NO. : 4,921,313

DATED : May 1, 1990

INVENTOR(S) : Tetsuro Arikawa

It is certified that error appears in the above-identified patent and that said Letters Patent is hereby corrected as shown below:

```
Column 1, line 26, change "an" to --and--.
Column 2, lines 11-12, delete "arrangement".
Column 2, line 36, change "and" to --end--.
Column 5, line 49, change "comprised" to --comprises--.
Column 7, line 11, change "intercepted" to
                                        --interrupted--.
Column 7, line 52, change "wheel .6a" to --wheel 6a--.
Column 8, line 18, change "Insteads" to --Instead--.
```

Signed and Sealed this

Seventh Day of April, 1992

Attest:

HARRY F. MANBECK, JR.

*Attesting Officer*   *Commissioner of Patents and Trademarks*